July 8, 1958  P. T. HUTCHISON ET AL  2,842,766
BEAM-SHAPING ANTENNA SYSTEMS
Filed July 28, 1950  3 Sheets-Sheet 1

ANGLE FROM REFLECTOR AXIS

INVENTORS
PAUL T. HUTCHISON
PAUL HINES
BY
ATTORNEY

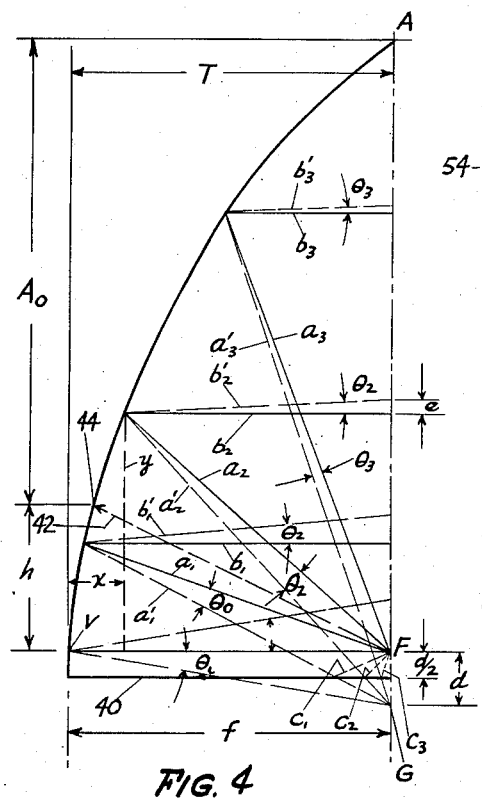
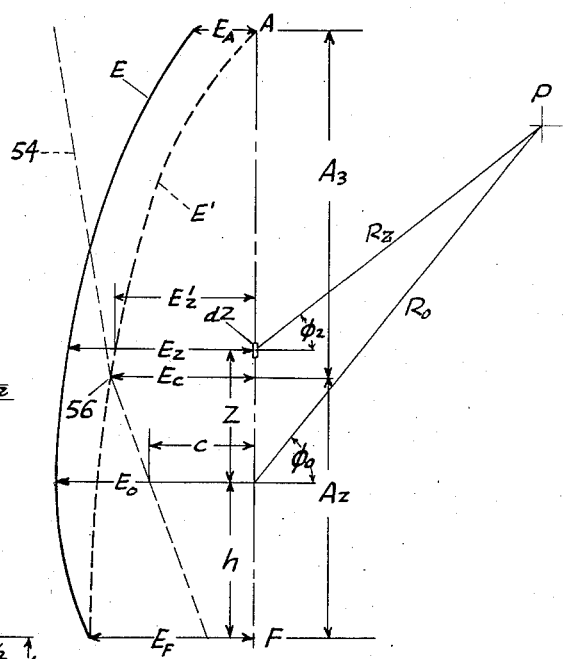
FIG. 6
FIG. 4
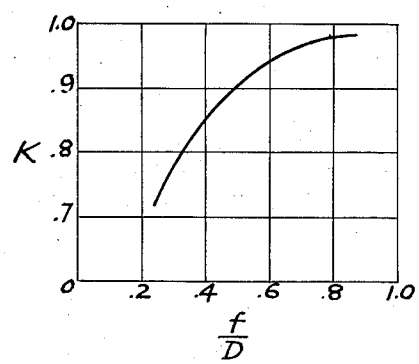
FIG. 5
INVENTORS
PAUL T. HUTCHISON
PAUL HINES
BY Elmer J. Gorman
ATTORNEY

INVENTORS
PAUL T. HUTCHISON
PAUL HINES
BY
ATTORNEY

United States Patent Office 2,842,766
Patented July 8, 1958

2,842,766

BEAM-SHAPING ANTENNA SYSTEMS

Paul T. Hutchison, Watertown, and Paul Hines, Waltham, Mass., assignors to Raytheon Manufacturing Company, Newton, Mass., a corporation of Delaware Application July 28, 1950, Serial No. 176,296

2 Claims. (Cl. 343—775)

This invention relates to radio energy beam shaping and more particularly to a directional antenna beam-shaping system.

In radar systems, the highly directive beams, known as pencil beams, obtainable with microwave antennas, permit the achievement of large antenna gain, precision direction finding, and high degree of resolution of complex targets. However, for such purposes as the exploration of a wide angular region, as when searching for airplane targets from a ground radar station, or ground targets from an airplane installation, these sharp pencil beams are not satisfactory. Because they cover so small an area at any instant, it requires an involved scanning operation in which the scanning time becomes a limiting factor. This problem is much simplified by fanning the beam broadly in a single plane to cover the above-mentioned angular region so as to reduce the required scanning to only one direction, namely, in a plane perpendicular to the plane in which the beam is fanned.

For example, in the case of ground radar in search of aircraft targets the beam may be shaped in elevation, yet required to be sharp in azimuth, the azimuth coverage being obtained by scanning. The elevation shaping of the beam for this purpose should provide coverage on aircraft up to a selected altitude and angle of elevation and out to the maximum range of the system. It is desirable to obtain this coverage without wasteful use of available power and to maintain a fixed minimum of illumination on the aircraft target along the extremity of the coverage diagram. A suitable relation for effecting this is by maintaining a shaped beam pattern proportional to a $csc^2\phi$ function where $\phi$ is the angle from the radar antenna system to the target as measured from a horizontal reference line.

To obtain such a shaped beam pattern in the past, a general practice has been to use multiple feed arrays as horns, dipoles and the like with parabolic reflectors. There are many disadvantages to such an arrangement. Each of the feed elements in the array must be set so that the lobes formed therefrom by the reflectors are all in phase with each other. This is difficult to achieve. For example, the electric field intensities at the horns of horn feed arrays change due to change in velocity of propagation of energy in the wave guides as the energy frequency changes. This causes serious dips or irregularities in the $csc^2\phi$ pattern at certain frequencies where an appreciable bandwith is used. Also a horn feed array presents problems of extreme complexity of design, and the bulk and weight of the resulting feed are distinct disadvantages. Even where other types of feed arrays, as dipoles, are used, undesirable complexities still exist. Each dipole must be set at a point of maximum gain from the reflector. The position of each dipole should be such that the lobes of each dipole are all in phase with each other. The power must be divided between the several dipoles to obtain the desired beam shape. The input impedance of the dipole array must be such as to terminate the transmission line properly.

It is also desirable that beam-shaping systems lend themselves to theoretical approximation for producing the desired beam shape so as to prevent a necessity for expensive cut and try methods which have heretofore been found generally necessary in this field.

Pursuant to the present invention, these and other problems connected with multiple feed arrays are overcome by an arrangement which, while lending itself to inexpensive construction and ease of manufacture, achieves shaped beam formations including shapes satisfactorily approximating the desirable $csc^2\phi$ function.

This is achieved generally by providing a curved ray reflecting surface terminated a short distance below its axis by a flat reflecting plate, herein termed a ground plane, the arrangement being illuminated by a single radiation feed source, such as a horn. The image of the feed source in the ground plane produces substantially the effect of an additional feed from an apparent or imaginary source displaced from the first-mentioned or real feed source. The real feed source produces a main beam or lobe from the curved reflecting surface while the imaginary feed produces a second beam or lobe, herein termed the image beam or lobe, from the curved reflecting surface. The present embodiment of the invention achieves an approximation of the desirable $csc^2\phi$ pattern by merging the lobe due to the image of the ground plane into the main lobe. By using a horn as the real feed source desired, simplicity of construction, as well as directivity of illumination over the curved reflecting surface to give desired energy characteristics of the resulting shaped beam, are obtained. By providing the curved reflecting surface in the form of a paraboloid of revolution about the parabolic axis and a ground plane below this axis intersecting the paraboloid, good beam-forming charactiristics are obtained, as well as simplicity and economy of construction. With the ground plane set slightly off the parabolic axis on the side of the axis opposed to that of the paraboloid, control of the displacement of the image lobe from the main lobe is achieved. Also, by arranging the ground plane to intersect the parabolic surface, an undesirable side lobe forming edge discontinuity is thereby removed.

The aim of the horn is preferably such as to produce an illumination intensity over the reflector aperture with the intensity peaked at the center and tapered down at the boundaries of the aperture, thereby reducing the side lobes and increasing the beam width. Further shaping and smoothing out of the beam pattern to more closely approximate a $csc^2\phi$ function is achieved by using several ground planes intersecting each other and forming progressively increasing angles with the parbolic axis.

This and other features, objects and advantages of the invention will become more apparent from the following description taken in connection with the accompanying drawings, wherein:

Fig. 4 is a diagrammatic view of a parabolic reflecting surface and single ground plane arranged to assist in a theoretical analysis of the invention;

Fig. 5 is a graph for evaluating a constant used in the theoretical analysis of the invention;

Fig. 6 is a diagram arranged in connection with Fig. 4 to assist in the theoretical analysis of the invention;

Figure 1:
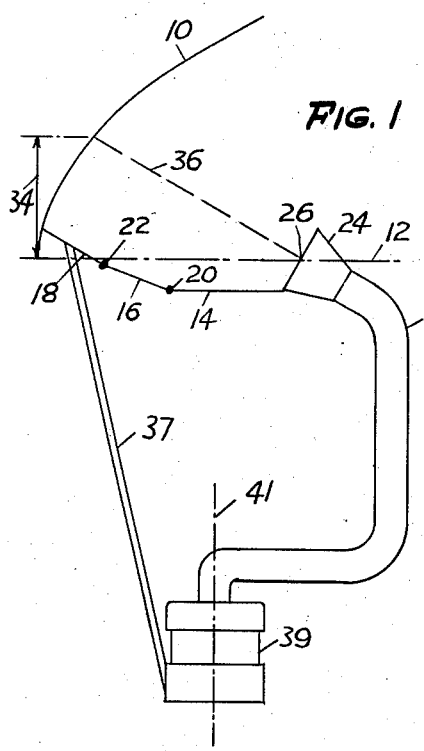
Fig. 1 is a cross-sectional diagrammatic view of one embodiment of the invention, the section being taken on line 1—1 of Fig. 2.

Referring to the drawings in more detail, a parabolic reflecting surface 10 of any suitable material for reflecting microwave energy is formed in substantially a half paraboloid of revolution about its parabolic axis 12. A series of preferably flat ground planes 14, 16 and 18 provide a bottom closure for the paraboloid 10. The ground planes may also be of any suitable material for reflecting microwave energy. The ground plane 14 is preferably parallel to the axis 12, while ground planes 16 and 18 define successively increasing angles with the axis 12 to assist in shaping one side of the resulting beam to form a pattern in this instance approximating a $csc^2 \phi$ function as mentioned above. The ground planes 14, 16 and 18 are made to intersect preferably so that their lines of intersection 20 and 22 are at right angles to the axis 12.

While in the present embodiment only three ground planes are used, a larger or smaller number of ground planes having successively varying angles with the axis 12, as mentioned above, may be used. For some purposes, a single ground plane as 14, slightly displaced from axis 12 and on the side of axis 12 opposed to that of the paraboloid 10, may be used by extending it parallel to axis 12 so as to intersect and form a ground plane closure for the paraboloid 10. Also, in some instances, additional concave or convex curvature may be provided on the ground plane.

Figure 2:
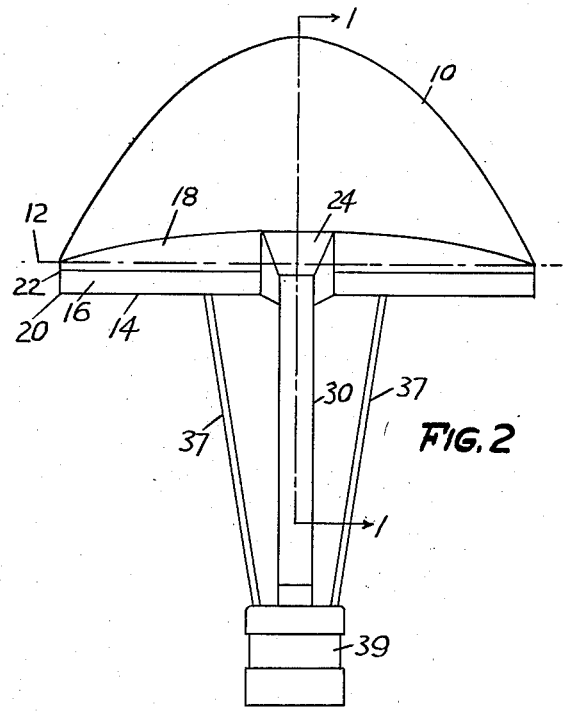
Fig. 2 is a diagrammatic front elevational view of the embodiment of Fig. 1.

The above arrangement, when illuminated preferably by a directive radiation source, as a horn 24, which also preferably has its bottom edge touching the edge of ground plane 14 and located at focal point 26 on axis 12 of the paraboloid 10, by microwave radio energy from a suitable microwave generator (not shown) through wave guide 30, forms a shaped beam which is fanned in the plane defined by axis 12 and line 1—1 (Fig. 2), herein termed the elevational plane. This beam is relatively sharp in a plane perpendicular to the elevational plane and herein termed the azimuth plane. By changing the height 34 of the aim 36 of the horn 24 of the reflecting surface 10, the maximum radiation of the formed beam may be varied and controlled by a limited amount. The ground plane 14 with the other ground planes arranged, as explained, permit pointing down the beam below the center of the antenna, thereby reducing spillover at the top of the aperture, minimizing back radiation and conserving radiation energy. The shape of the beam pattern may be varied by the position and number of ground planes as 14, 16, and 18. By increasing the number of ground planes, the shaped beam pattern may be smoothed. A typical beam shape pattern in the elevation plane produced by a directional antenna system, as shown and described with regard to Figs. 1 and 2, is shown by curve 38 in Fig. 3 for microwave radio energy radiation having a wave length of 1.25 centimeters and a paraboloidal reflector 30 inches in diameter.

The above antenna system lends itself to beam shape approximations by theoretical computation which will now be undertaken.

Referring to Fig. 4, when a parabolic surface VA, or any part thereof, is illuminated by a radiating energy source, as horn 24 (Fig. 1) at the focal point F, all the reflected rays are parallel to the axis defined by a line through the vertex V and focal point F of the parabolic surface VA. By definition of a parabolic surface, rays $a_1+b_1=a_2+b_2= \ldots =a_n+b_n$. Therefore all rays are in time phase when they pass a broken line AF perpendicular to axis VF to form a beam of radiated energy. Analysis shows that the maximum radiation is parallel to VF, regardless of the aim of the feed horn.

If the energy radiating source is moved below the focal point $d$ (Fig. 4), the direction of the resulting beam will be shifted to an upward direction above axis VF by an angle proportional to $d/f$, where $f$ is the focal length or distance from the vertex V to the focal point F. The rays, shown by dotted lines $b'$ originating as rays $a'$ from a point G below the focal point F and reflected from the parabolic surface VA, are no longer parallel. The phase of each ray is different when it reaches the line AF since the rays $a'_1+b'_1$ are not equal to $a'_2+b'_2$. As shown by Fig. 4, the angles formed between parallel rays shown by solid lines $b_1$, $b_2$, $b_3$ by illumination from the focal point F and corresponding rays shown by broken lines $b'_1$, $b'_2$, $b'_3$ by illumination from point G below the focal point F progressively decrease. Thus $\theta_0 > \theta_1 > \theta_2 > \theta_3$. The variation of these angles is from a maximum of $$\theta_0 = \tan^{-1} \frac{d}{f}$$

for a ray striking the vertex to an angle of $\theta=0$ for corresponding rays striking point A.

In this case of illumination, as by a horn 26 (Fig. 1) from a point G below the focal point F, the maximum radiation will always be above axis VF by some angle proportional to $d/f$, and will change slightly as the horn aim toward the parabolic surface VA is changed. The beam of such off-axis illuminated or fed parabola will deteriorate only slightly so long as the ratio $d/f$, is kept small. The angular movement of the beam off-axis VF, as the point source of illumination or feed is moved from the focal point F toward G, will be in a direction opposite to that of the feed movement and in direct proportion to the feed displacement. The angle of the resulting beam from the axis VF may be expressed as $K\theta_0$ where $$\tan \theta_0 = \frac{d}{f}$$

and the proportionality factor K is less than unity and is dependent on the ratio of focal length $f$ to the diameter of the parabola. The value of K may be found from the graph in Fig. 5 where D is the diameter of the parabola. The effect of an off-axis feed from a point G is achieved by providing a ground plane 40 (Fig. 4) parallel to axis VF and a distance $d/2$, below axis VF and using the focal point F as the actual point of feed. The rays shown by dotted lines $C_1$, $C_2$ and $C_3$ are reflected to form rays $a'_1$, $a'_2$ and $a'_3$ which appear to originate from point G which is a distance $d/2$, below the ground plane 40. The imaginary radiator at G is an image of the radiator at F and is directively a function of the radiator at F. Theoretically, finding the resultant beam of this directional antenna system requires, as a first step, finding the shape of the beam formed by the direct rays $a_1$, $a_2$ and $a_3$ from the radiating source at the focal point F and herein termed the main beam.

To find the shape of the main beam, it may be assumed that a radiation source, such as a horn 26 (Fig. 1), aimed from point F along broken line 42 (Fig. 4) and hitting the parabolic reflecting surface VA at a point 44 a distance $h$ above axis VF, produces illumination that gives sinusoidal variation of electric field intensity across the reflector aperture AF. This may be graphically shown by an electric field intensity curve E in Fig. 6 where, for purposes of clarity in the following discussion, only the aperture line AF of the directional antenna system of Fig. 4 is shown. The antenna is horizontally polarized, and the phase of the electric field intensity E is constant.

In Fig. 6, the amplitude of E across the aperture AF any distance Z from the height $h$ where the maximum amplitude $E_0$ occurs is $$E_Z = E_0 \cos \alpha\, Z$$

where $\alpha$ is a constant which is adjusted so $$E_A = E_0 \cos \alpha\, A_0$$

Since the aperture AF is large with respect to the wave length of illuminating radiation, the field intensity at any point P due to reflected energy passing through an element of aperture $dZ$ may be expressed $$d\overline{E} = \frac{CE_Z}{R_Z} \epsilon^{j(\omega t - BR_Z)}$$

where $C$ is a constant of proportionality
$\omega = \pi\sigma$ where $\sigma$ is the frequency of the wave
$B = \frac{2\pi}{\lambda}$ where $\lambda$ is the wave length
$t$ = time
$R_Z$ = distance from the element $dZ$ to point P
$j$ = a quadrature operator
$\epsilon$ = base for Naperian logarithm (2.718)

If the distance to point P is very large as is normally true under practical operating conditions $$\frac{1}{R_Z} \approx \frac{1}{R_0}, \quad \phi_0 \approx \phi_Z$$

and $$R_Z = R_0 - Z \sin \phi_0$$

The electric field at point P due to aperture AF may be approximated by $$\overline{E}_1 = \frac{CE_0}{R_0} \epsilon^{-jBR_0} \int_{Z=-h}^{Z=A_0} \cos \alpha Z\, \epsilon^{jBZ \sin \phi_0} dz$$

Evaluation of the above equation gives one real and one "$j$" or quadrature component of E. For purposes of illustration, evaluation for one case has been made and the results with real component 43 and quadrature component 45 plotted in Fig. 7. For this case the following values have been used $$-h = 14''$$
$$A_0 = 22''$$
$$\alpha = \frac{\pi}{22(2.53)}$$
$$B = \frac{2\pi}{\lambda} = \frac{2\pi}{1.28}$$

Figure 7:
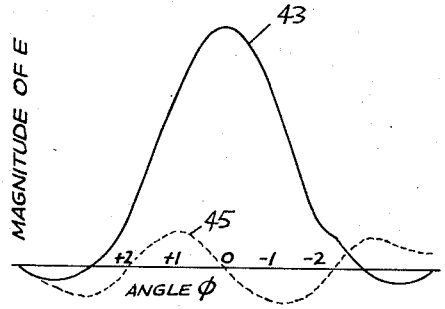
Fig. 7 is the plot of a main lobe pattern obtained in the invention.

In Fig. 7, the quadrature component 45 of E is small since the degree of symmetry is small. This 90° or quadrature relationship is a time relation and should not be confused with space, for the E vectors are collinear. The relation is $$E_{\text{total}} = \sqrt{(E(\text{real}))^2 + (E \text{ quad})^2}$$

E quadrature vanishes when the illumination is symmetrical.

Figure 8:
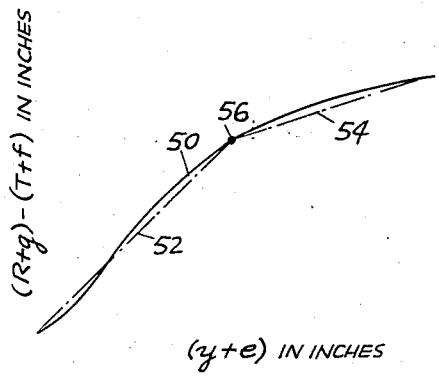
Fig. 8 is a graph for assisting and determining phase relations in the theoretical analysis of the invention.

Having found the main beam shape, the next step in determining the resultant beam shape is to find at the aperture AF the variation in phase of the various rays which are reflected from the ground plane. To do this it is necessary to find the distance that any ray travels in going from the image radiation source G (Fig. 4) to the parabolic reflecting surface VA and from the surface VA to the aperture or mouth AF of the reflecting surface. This distance may be calculated by the following formulas taken in connection with Fig. 4 which show the dimensions used.

$$y = \sqrt{4fx}$$

$$b'_n = a'_n \frac{(4f^2 + y^2)(4fT - y^2)}{(4f^2 + y^2)^2 + 16f^2 yd}$$

$$a'_n + b_n =$$
$$\frac{1}{4f}[(4f^2+y^2)^2 + 16f^2 d(d+2y)]^{1/2}\left[1 + \frac{(4f^2+y^2)(4fT-y^2)}{(4f^2+y^2)^2 + 16f^2 yd}\right]$$

$$e = \sqrt{(b_n')^2 - (T-x)^2}$$

where $b'_n$ = is a generalization of the length of ray $b'_2$
$a'_n$ = is a generalization of the length of ray $a'_2$ Using the above equations, an exemplary plot variation in ray travel distance $(a'_n + b'_n)$ from the imaginary radiation source G to the aperture AF versus position $(y+e)$ across aperture AF is made in Fig. 8 for one particular set of conditions where $$d = 1 - \frac{1''}{2}$$

$f = 21''$, $T = 15.4''$ and is shown by curve 50. The curve 50 in Fig. 8 may be very closely approximated by two straight lines 52 and 54. The analysis therefore will be carried out as for two separate apertures $A_2$ and $A_3$, Fig. 6, to simplify necessary integrations. The apertures $A_2$ and $A_3$ are found by combining the information from the graph in Fig. 8 with the diagram in Fig. 6. By using the aperture AF in Fig. 6 as abscissa and superimposing the phase slope, lines 52 and 54 found from the graph in Fig. 8, thereon, the aperture AF is divided into the two apertures $A_2$ and $A_3$ as the position of point 56 projected upon the aperture AF. The point 56 is the intersecting point of the phase slope lines 52 and 54.

As previously assumed for the direct illumination analysis above, the illumination from the imaginary source G (Fig. 4) is also assumed to be sinusoidal illumination across aperture AF and having an amplitude shown by a broken line amplitude curve E' with $E_F$ being the maximum amplitude. For aperture $A_3$ this assumption is very approximate, but, since the illumination in aperture $A_3$ is 10 decibels less than peak illumination, suitable approximate results may be obtained.

Referring to Fig. 6 for symbols $$E_2' = E_f \cos \gamma\, (Z - H)$$

where $\gamma$ is found by the relation $$\cos[(\gamma)(A_2 + A_3)] = 0$$

The phase $\Omega$ of E' across $A_2$ is $\Omega = B(c + m_1 Z)$ and it is lagging where $$B = \frac{2\pi}{\lambda}$$

where $\lambda$ is the wave length of illumination
$c$ = distance shown in Fig. 6
$m_1$ = slope of the straight line 52 in Figs. 6 and 8

The electric field intensity at point P due to the aperture $A_2$ is $$E_2 = \frac{KE_F}{R_0}\epsilon^{-jBR_0}\int_{Z=-h}^{Z=A_2-h} \cos\gamma(Z-h)\,\epsilon^{j[B(\sin\theta - m_1)Z - Bc]} dz$$

The above equation may be written $$E_2 = \frac{KE_F}{R_0}\epsilon^{-jBR_0}\epsilon^{-jBc}\int_{Z=-h}^{Z=A_2-h} \cos\gamma(Z-h)\,\epsilon^{jBZ(\sin\phi - m_1)} dz$$

The integrand gives a beam which has real and imaginary components, and gives maximum energy at $$\phi_{\max} = \sin^{-1}(m_1)$$

The operator $\epsilon^{-jBc}$ shifts the vector intensity through $Bc$ degrees, so it may be added directly to $E_1$ discussed with regard to the main beam above. The operator $\epsilon^{-jBc}$ takes into account the 180° phase shift of the rays striking the metal ground plane.

The aperture $A_3$ gives rise to a third beam whose magnitude is proportional to $E_c$ and to $A_3$. The electric field intensity due to aperture $A_3$ is $E_3$, and its magnitude can be found from an equation similar to that above for $E_2$.

The total electric field intensity $E_T$ at any particular angle $\phi$ is the vector sum of $E_1$, $E_2$, and $E_3$ and expressed $$\overline{E}_T = \overline{E}_1 + \overline{E}_2 + \overline{E}_3$$

Figure 9:
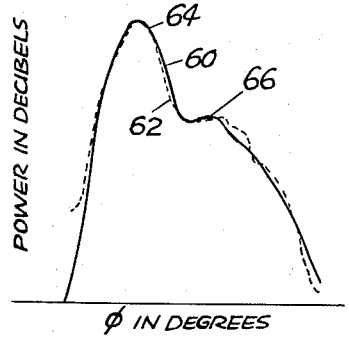
Fig. 9 is a graph illustrating a typical beam pattern obtained with a single ground plane in the invention.

The accuracy of the above theoretical analysis to which the present invention lends itself is illustrated in Fig. 9, wherein are plotted both measured and calculated patterns for a particular directional antenna system as shown in Fig. 4, and having only a single ground plane. In Fig. 9 the actual or measured values are shown by the solid line curve 60 and the calculated results by the broken line 62. The antenna system used had a ground plane VF (Fig. 4) a distance $d = \frac{3}{4}''$ below the focal point F. The parabolic reflecting surface AV had a focal length $f = 21$ inches. The aim of a horn illuminating source at F was such that aiming line 42 hit a point 44 which was a distance $h = 14''$ above vertex V. The wave length of illumination used was 3.25 centimeters.

Fig. 9 shows a main lobe 64 caused primarily from the main beam as explained above by the direct illumination from F (Fig. 4), and an image lobe 66 caused primarily by the reflected illumination from the reflection image from the apparent source G (Fig. 4). The phase relation of the rays from the direct source F and the rays from apparent image source G, due to the difference in path lengths to the aperture AF, are out of time phase by more than the 180° due to reflection alone at the ground plane 40 by an amount determined by the focal length $f$ and image displacement $d$, as has been hereinbefore shown with respect to Fig. 8.

In a cursory examination the main beam and the beam produced by the ground plane might have been considered 180° out of time phase due to the phase reversal of waves striking the ground plane. If this were so, there would always be a distinct null between the two lobes; but that this is not so may be seen from the above theoretical discussion which showed: (1) that the rays emanating from the image horn travel a longer path before reaching the aperture than do rays coming from the focal point and (2) that the aperture is not symmetrically illuminated. Thus the time phase of E, in each beam individually, is not constant.

Reason (1) above is evident from the discussion concerning rays $a_1 + b_1 \neq a' + b'$. For this reason alone, the E vectors in the two beams would not be 180° out of time phase, but rather some larger value determined by $f$ and $d$.

Reason (2) above is not apparent since most apertures are symmetrically illuminated. When the illumination is not symmetrical as in the present embodiment, a quadrature component of E is present as shown in Fig. 7. In such case the relative time phase relationship of E is given by $$\psi = \tan^{-1} \frac{E_{\text{quadrature}}}{E_{\text{real}}}$$

At no two values of $\phi$ Fig. 6 will the intensities of such a beam be in time phase. In the analysis above, all three apertures $A_1$, $A_2$ and $A_3$ (Fig. 6) were asymmetrically illuminated, so the total E, at any angle $\phi$, will be the sum of three vectors $E_1$, $E_2$ and $E_3$ where the magnitude and phase of each changes with $\phi$. This means there is little chance that the pattern will have severe dips or nulls.

A $\csc^2 \phi$ pattern is obtained by proper merging of the lobe due to the image into the main lobe and aiming the horn at F (Fig. 4) near enough to the vertex V to obtain the desired energy in the lobe. The separation of the main and image lobes increases as $d/2$ increases and the energy level of the lobe increases as the aim of the horn at F approaches the vertex V. The beam width of the lobe becomes greater as $d/2$ increases because of a defocusing in the paraboloid reflecting surface.

The addition of the main beam and the beam due to the ground plane will give a $\csc^2 \phi$ pattern quite accurately from a half power width of the beam to about two or three times the beam width, depending on the beam width.

If a $\csc^2 \phi$ pattern is needed to a larger angle $\phi$, it may be accomplished by adding other ground planes at different angles with the axis 12 (Fig. 1). The energy from each ground plane as 14, 16, 18 (Fig. 1) is a function of the size of each ground plane and the aim 36 of the feed or horn 24. The positions of the image lobes depend on the angles the ground planes make with the axis 12. To obtain a $\csc^2 \phi$ pattern, the widths of the planes starting with 14 (Fig. 1) should be made progressively smaller, thus $$14 > 16 > 18$$

Figure 3:
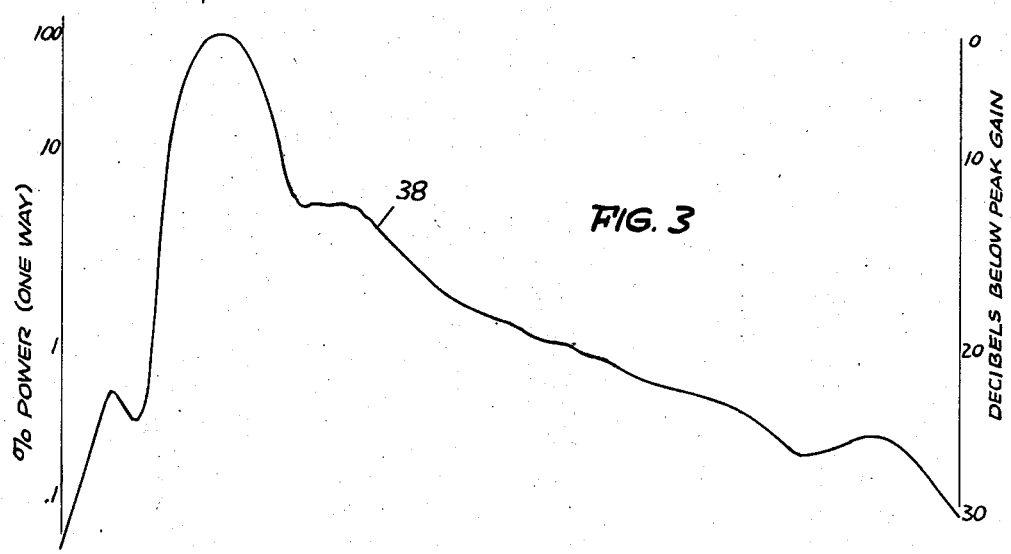
Fig. 3 is a graph illustrating a typical beam formation obtainable by the embodiment in Fig. 1.

The exemplary pattern for such a ground plane arrangement is shown in Fig. 3 and presents in this instance a $\csc^2 \phi$ pattern from $1 - \frac{1}{4}°$ as a reference to approximately 25°.

Such a system may also be used over relatively wide bandwidths of illumination. For a system as shown in Figs. 1 and 2, a relatively constant pattern was maintained over an 8% bandwidth.

Figure 10:
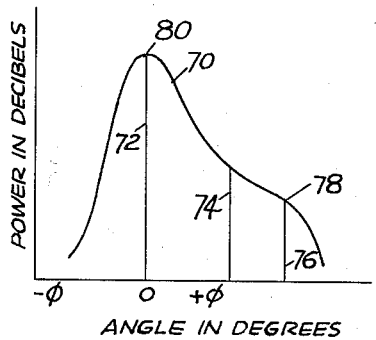
Fig. 10 is a graph for assisting in the theoretical discussion.

The width of the ground plane does not have to be as wide as the aperture of the dish in the E plane to get the $\csc^2 \phi$ beam, but the aperture of the paraboloid reflecting surface illuminated by the ray striking the ground planes will be smaller; thus the E plane beam width off axis will be somewhat wider. An exemplary case is shown by Fig. 10 where curve 70 is an illustrative "H" or magnetic plane pattern of a shaped beam by a ground plane running the full width of the aperture of the parabola. Test readings were taken on E planes shown as lines 72, 74 and 76, respectively, in Fig. 10. The plane 76 intersected the curve 70 at a point 78, 20 decibels below the beam peak value at 80, the intersecting point of plane 72. The beam widths in these E planes were sharp and increased only from 1.5° at plane 72 to 2½ at plane 76.

An advantage of this type of antenna is that the bottom part of the paraboloid reflecting surface may be heavily illuminated and still prevent spillover because of the presence of the ground plane. This results in a higher area efficiency for a given aperture and therefore means a higher gain.

This invention is not limited to the particular details of construction described, as many equivalents will suggest themselves to those skilled in the art. It is accordingly desired that the appended claims be given a broad interpretation commensurate with the scope of the invention within the art.

What is claimed is:

1. A directional antenna system comprising a segment of a parabolic reflecting surface of revolution about the parabolic axis and forming substantially a half paraboloid of revolution, a series of intersecting flat reflecting surfaces at least one of which is disposed on the side of the parabolic axis opposite said parabolic surface, said intersections being along lines perpendicular to said axis, and a radiating element located adjacent the focal point of said parabolic surface and adjacent said flat reflecting surfaces, said element being directed at a point on the parabolic surface above said axis for illuminating said surface with electromagnetic energy, said flat reflecting surfaces being interceptive of a substantial portion of the energy radiated from said radiating element, said parabolic and flat reflecting surfaces terminating in each other to form an antenna whose energy distribution varies substantially as the square of the cosecant of the angle measured from said parabolic axis.

2. A directional antenna comprising a segment of a parabolic reflecting surface of revolution about the parabolic axis and forming substantially a half paraboloid of revolution, a plurality of substantially flat reflecting surfaces intersecting each other along lines perpendicular to said axis, at least one of said flat surfaces being positioned on the side of the parabolic axis opposite said parabolic surface, said flat reflecting surfaces forming progressively increasing angles with the parabolic axis and having progressively smaller widths starting with the one farthest removed from said parabolic surface, an electromagnetic radiating element contacting one of said flat reflecting surfaces and directed at a point on the parabolic surface above the parabolic axis for illuminating the parabolic surface with electromagnetic energy, said parabolic surface and one of said flat reflecting surfaces terminating in each other to form an antenna whose energy distribution varies substantially as the square of the cosecant of the angle measured from the parabolic axis.

References Cited in the file of this patent

UNITED STATES PATENTS

| | | |
|---|---|---|
| 1,284,019 | Wood | Nov. 5, 1918 |
| 1,912,487 | Matera | June 6, 1933 |
| 2,283,935 | King | May 26, 1942 |
| 2,489,865 | Cutler | Nov. 29, 1949 |
| 2,512,147 | Gardner | June 20, 1950 |
| 2,534,271 | Kienow | Dec 19, 1950 |
| 2,555,123 | Gardner | May 29, 1951 |
| 2,567,746 | Van Atta | Sept. 11, 1951 |
| 2,600,274 | Sichak | June 10, 1952 |
| 2,644,092 | Risser | June 30, 1953 |

UNITED STATES PATENT OFFICE
Certificate of Correction

Patent No. 2,842,766                                                                      July 8, 1958

Paul T. Hutchison et al.

It is hereby certified that error appears in the printed specification of the above numbered patent requiring correction and that the said Letters Patent should read as corrected below.

Column 1, line 15, for "eenrgy" read —energy—; column 2, line 37, for "charactiristics" read —characteristics—; line 53, for "parbolic" read —parabolic—; column 4, line 39, for "K$\theta$-" read —K$\theta_o$,—; column 5, line 17, for "$\omega = \pi\sigma$" read —$\omega = 2\pi\sigma$—.

Signed and sealed this 23rd day of September 1958.

[SEAL]

Attest:
KARL H. AXLINE,
*Attesting Officer.*
                                                     ROBERT C. WATSON,
                                                     *Commissioner of Patents.*